US012654102B2

(12) United States Patent (10) Patent No.: US 12,654,102 B2
Hu et al. (45) Date of Patent: Jun. 16, 2026

(54) METHOD, COMPUTER DEVICE, AND STORAGE MEDIUM FOR TRANSFERRING VIRTUAL OBJECT BETWEEN MAPS

(71) Applicant: TENCENT TECHNOLOGY (SHENZHEN) COMPANY LIMITED, Shenzhen (CN)

(72) Inventors: Xiaoqiang Hu, Shenzhen (CN); Bin Qiu, Shenzhen (CN); Hao Huang, Shenzhen (CN); Xuan Wang, Shenzhen (CN); Chuhuan Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 494 days.

(21) Appl. No.: 18/342,722

(22) Filed: Jun. 27, 2023

(65) Prior Publication Data

US 2023/0338851 A1 Oct. 26, 2023

Related U.S. Application Data

(63) Continuation of application No. PCT/CN2022/131853, filed on Nov. 15, 2022.

(30) Foreign Application Priority Data

Feb. 21, 2022 (CN) .......................... 202210156976.2

(51) Int. Cl.
*A63F 13/5378* (2014.01)
*G06F 9/48* (2006.01)
*G06T 17/00* (2006.01)
(52) U.S. Cl.
CPC ........ *A63F 13/5378* (2014.09); *G06F 9/4881* (2013.01); *G06T 17/00* (2013.01)

(58) Field of Classification Search
None
See application file for complete search history.

(56) References Cited

U.S. PATENT DOCUMENTS 11,080,336 B2 * 8/2021 Van Dusen ............ G06Q 10/10
11,103,773 B2 * 8/2021 Rathod .............. G06Q 20/0655
(Continued)

FOREIGN PATENT DOCUMENTS

CN 106991713 A 7/2017
CN 113546416 A 10/2021
(Continued)

OTHER PUBLICATIONS

The World Intellectual Property Organization (WIPO) International Search Report for PCT/CN2022/131853 Feb. 9, 2023 6 Pages (including translation).

*Primary Examiner* — Van H Nguyen
(74) *Attorney, Agent, or Firm* — Anova Law Group, PLLC

(57) ABSTRACT

A method for transferring a virtual object between maps, executed by a source logic server, is provided and includes, when the virtual object enters a target sub-map from the current sub-map in a map and a determination frame centering on the virtual object is overlapped with the target sub-map, transmitting a map cutting request to a scheduling server, a projection area of the determination frame in the map being greater than a projection area of the virtual object in the map, and the scheduling server being connected to at least two logic servers; determining a target logic server from the at least two logic servers according to an object resource transferring notice returned by the scheduling server; and copying a resource of the virtual object to the target logic server, and after the copying is completed, destroying the resource of the virtual object.

11 Claims, 10 Drawing Sheets

(56)                    References Cited

U.S. PATENT DOCUMENTS

| | | | |
|---|---|---|---|
| 11,272,081 B2 * | 3/2022 | Chapman | H04N 21/4223 |
| 2013/0178257 A1 * | 7/2013 | Langseth | A63F 13/23 |
| | | | 345/419 |
| 2019/0251717 A1 * | 8/2019 | Liu | G09B 29/007 |
| 2019/0311341 A1 | 10/2019 | Rice | |
| 2023/0347244 A1 | 11/2023 | Chen et al. | |

FOREIGN PATENT DOCUMENTS

| | | |
|---|---|---|
| CN | 113797536 A | 12/2021 |
| CN | 113952720 A | 1/2022 |

* cited by examiner

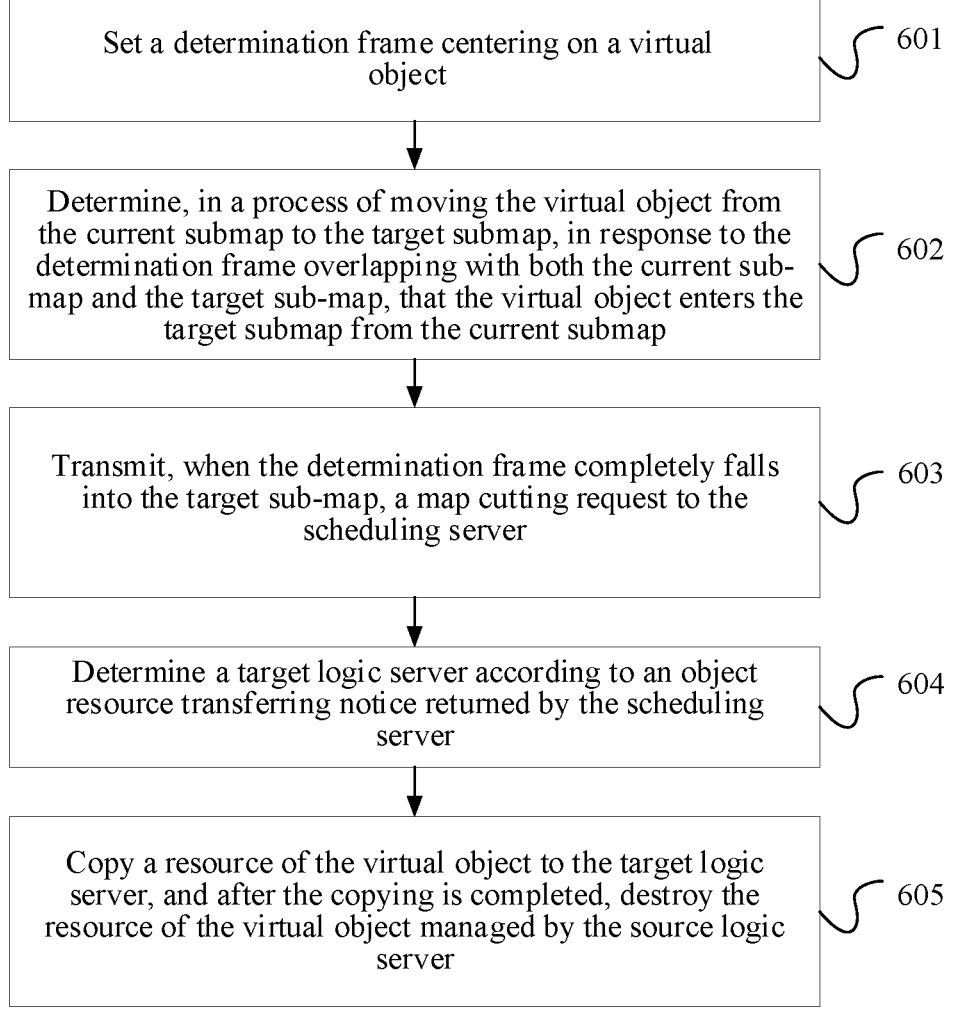

Set a determination frame centering on a virtual object
601

Determine, in a process of moving the virtual object from the current submap to the target submap, in response to the determination frame overlapping with both the current sub-map and the target sub-map, that the virtual object enters the target submap from the current submap
602

Transmit, when the determination frame completely falls into the target sub-map, a map cutting request to the scheduling server
603

Determine a target logic server according to an object resource transferring notice returned by the scheduling server
604

Copy a resource of the virtual object to the target logic server, and after the copying is completed, destroy the resource of the virtual object managed by the source logic server
605

FIG. 6

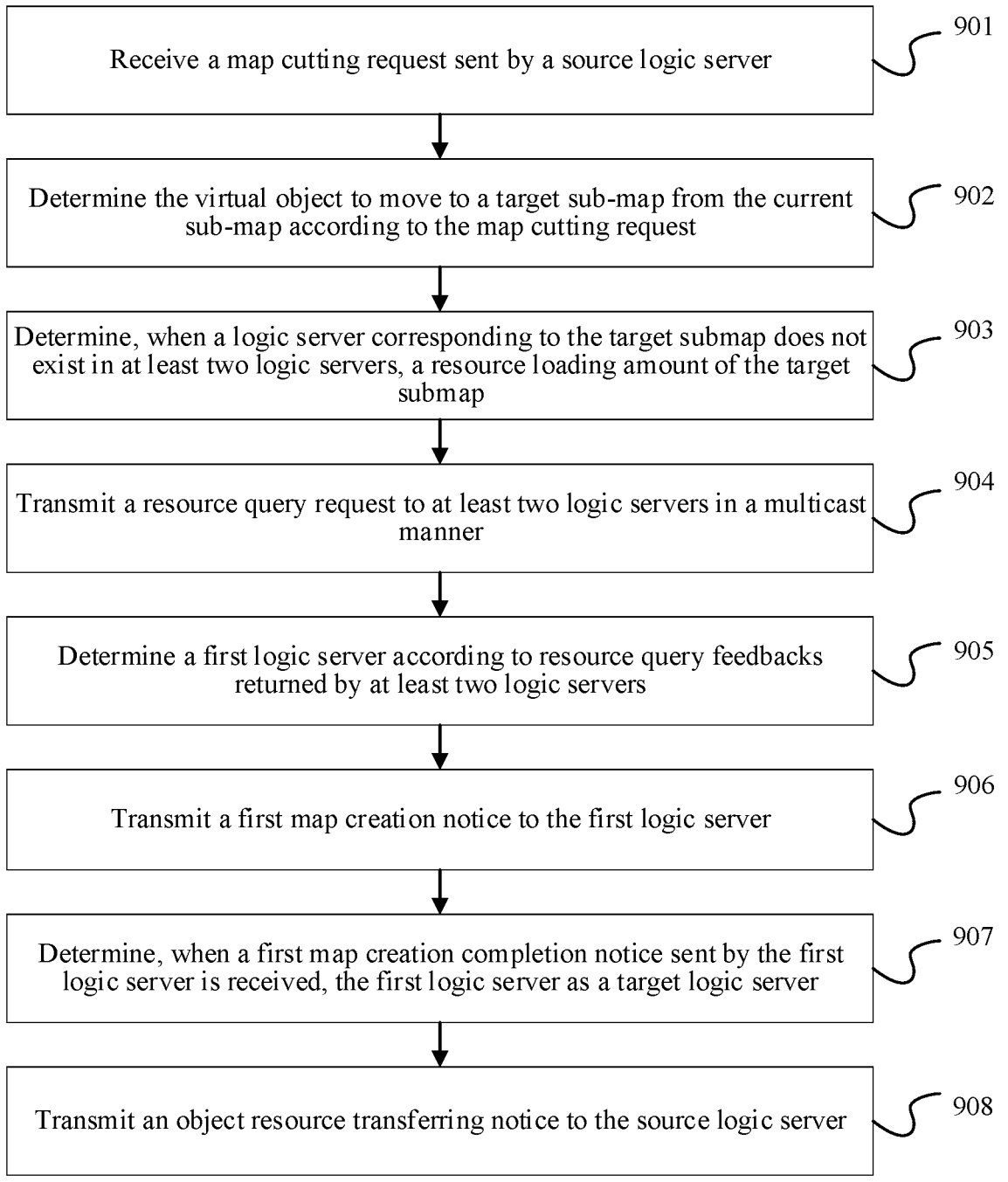

Receive a map cutting request sent by a source logic server            901

Determine the virtual object to move to a target sub-map from the current sub-map according to the map cutting request            902

Determine, when a logic server corresponding to the target submap does not exist in at least two logic servers, a resource loading amount of the target submap            903

Transmit a resource query request to at least two logic servers in a multicast manner            904

Determine a first logic server according to resource query feedbacks returned by at least two logic servers            905

Transmit a first map creation notice to the first logic server            906

Determine, when a first map creation completion notice sent by the first logic server is received, the first logic server as a target logic server            907

Transmit an object resource transferring notice to the source logic server            908

METHOD, COMPUTER DEVICE, AND STORAGE MEDIUM FOR TRANSFERRING VIRTUAL OBJECT BETWEEN MAPS

CROSS-REFERENCES TO RELATED APPLICATIONS

This application is a continuation application of PCT Patent Application No. PCT/CN2022/131853, filed on Nov. 15, 2022, which claims priority to Chinese Patent Application No. 2022101569762, filed on Feb. 21, 2022, all of which is incorporated herein by reference in their entireties.

FIELD OF THE TECHNOLOGY

The present disclosure relates to the field of online games and, in particular, to a virtual object transferring technology.

BACKGROUND OF THE DISCLOSURE

In an MMOG (i.e., Massive Multiplayer Online Game), different users play a game in the same virtual world. The virtual world is usually composed of multiple sub-maps that are stitched together.

Resources in different sub-maps are processed by different logic servers. For example, a first logic server processes a resource related to a virtual object in a current sub-map, and a second logic server processes a resource related to a virtual object in a target sub-map. In order to reduce frequent asynchronous communication between logic servers caused by back-and-forth movement of a virtual object between a current sub-map and a target sub-map, a logic server sets a buffer area between two sub-maps, and when a user controls the virtual object to enter the target sub-map from the current sub-map, the virtual object passes through the buffer area. When the virtual object is in the buffer area, a main virtual object is set on the first logic server to manage an activity of the virtual object, a proxy virtual object is created on the second logic server, and the main virtual object on the first logic server and the proxy virtual object on the second logic server need to be synchronized. After the virtual object is moved from the buffer area to the target sub-map, the proxy virtual object on the second logic server is switched to the main virtual object, and the main virtual object on the first logic server is deleted.

When the virtual object is in the buffer area, the activity of the virtual object may be controlled by either the main virtual object on the first logic server or the proxy virtual object on the second logic server, which however greatly increases development burden of a service logic. Some service logics (for example, for movement, vision, or combat) that originally only need to be completed in the first logic server also need to consider asynchronous communication with the second logic server, which makes these service logics complex, hard to be fully tested, and difficult to maintain and locate.

SUMMARY

Embodiments of the present disclosure provide a method for transferring a virtual object between maps, executed by a source logic server configured to manage a resource of virtual objects in a current sub-map. The method includes when the virtual object enters a target sub-map from the current sub-map in a map and a determination frame centering on the virtual object is overlapped with the target sub-map, transmitting a map cutting request to a scheduling server, a projection area of the determination frame in the map being greater than a projection area of the virtual object in the map, and the scheduling server being connected to at least two logic servers; determining a target logic server from the at least two logic servers according to an object resource transferring notice returned by the scheduling server; and copying a resource of the virtual object to the target logic server, and after the copying is completed, destroying the resource of the virtual object.

Embodiments of the present disclosure also provide a computer device. The computer device includes a processor and a memory, the memory storing at least one section of program and the at least one section of program being loaded and performed by the processor to implement a method for transferring a virtual object between maps. The method includes when the virtual object enters a target sub-map from the current sub-map in a map and a determination frame centering on the virtual object is overlapped with the target sub-map, transmitting a map cutting request to a scheduling server, a projection area of the determination frame in the map being greater than a projection area of the virtual object in the map, and the scheduling server being connected to at least two logic servers; determining a target logic server from the at least two logic servers according to an object resource transferring notice returned by the scheduling server; and copying a resource of the virtual object to the target logic server, and after the copying is completed, destroying the resource of the virtual object.

Embodiments of the present disclosure further provide a non-transitory computer-readable storage medium storing program code. The program code is loaded and performed by a processor to implement a method for transferring a virtual object between maps. The method includes when the virtual object enters a target sub-map from the current sub-map in a map and a determination frame centering on the virtual object is overlapped with the target sub-map, transmitting a map cutting request to a scheduling server, a projection area of the determination frame in the map being greater than a projection area of the virtual object in the map, and the scheduling server being connected to at least two logic servers; determining a target logic server from the at least two logic servers according to an object resource transferring notice returned by the scheduling server; and copying a resource of the virtual object to the target logic server, and after the copying is completed, destroying the resource of the virtual object.

The technical solutions provided in embodiments of the present disclosure have at least the following beneficial effects. For example, when a virtual object passes through a sub-map, a resource of the virtual object managed by a source logic server is copied to a target logic server, and after the copying is completed, the resource of the virtual object managed by the source logic server is destroyed. When a virtual object moves back and forth between a current sub-map and a target sub-map, a resource of the virtual object disclosed in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

BRIEF DESCRIPTION OF THE DRAWINGS

FIG. 6 is a schematic flowchart of a method for transferring a virtual object between maps provided by an embodiment of the present disclosure.

FIG. 9 is a schematic flowchart of a method for transferring a virtual object between maps provided by an embodiment of the present disclosure.

DESCRIPTION OF EMBODIMENTS

To make objectives, technical solutions, and advantages of the present disclosure clearer, the following further describes various embodiments of the present disclosure in detail with reference to the accompanying drawings.

The term "virtual environment" refers to a virtual environment that an application displays (or provides) when running on a terminal. The virtual environment may be a three-dimensional virtual environment or a two-dimensional virtual environment. The virtual environment may be a simulation environment of a real world, a semi-simulation and semi-fictional environment, or a purely fictional environment.

The term "virtual object" refers to a movable object in a virtual environment. The movable object may be a virtual character, a virtual animal, a cartoon character, and the like, for example: a character, an animal, a plant, an oil drum, a wall, a stone and the like displayed in the virtual environment. In one embodiment, when a virtual environment is a three-dimensional virtual environment, a virtual object is a three-dimensional model created based on an animated bone technology, and each virtual object has its own shape and volume in the three-dimensional virtual environment, and occupies a part of the space in the three-dimensional virtual environment. In one embodiment, when a virtual environment is a two-dimensional virtual environment, the virtual object is a two-dimensional plane model created based on an animation technology, and each virtual object has its own shape and area in the two-dimensional virtual environment, and occupies a part of the area in the two-dimensional virtual environment.

The term "map loading" refers to client's cut-scene representation when a virtual object is transferred from one map to another.

The term "seamless big world" includes a large continuous game space that can be represented by a big map. The seamless big world is composed of multiple sub-maps, and when a user controls a virtual object to move between sub-maps, cut-scene representation may not be displayed on a client. The opposite of the seamless big world is a non-seamless big world, which is also composed of multiple sub-maps, but when a user controls a virtual object to move between sub-maps, cut-scene representation may be displayed on a client.

Notably, information (including but not limited to user device information, user personal information), data (including but not limited to data for analysis, stored data, displayed data), and signals involved in the present disclosure are authorized by a user or sufficiently authorized by various parties, and collection, use, and processing of related data require compliance with related laws and regulations and standards in related countries and areas. For example, a virtual object and related information of a virtual object involved in the present disclosure are obtained with sufficient authorization.

Figure 1:
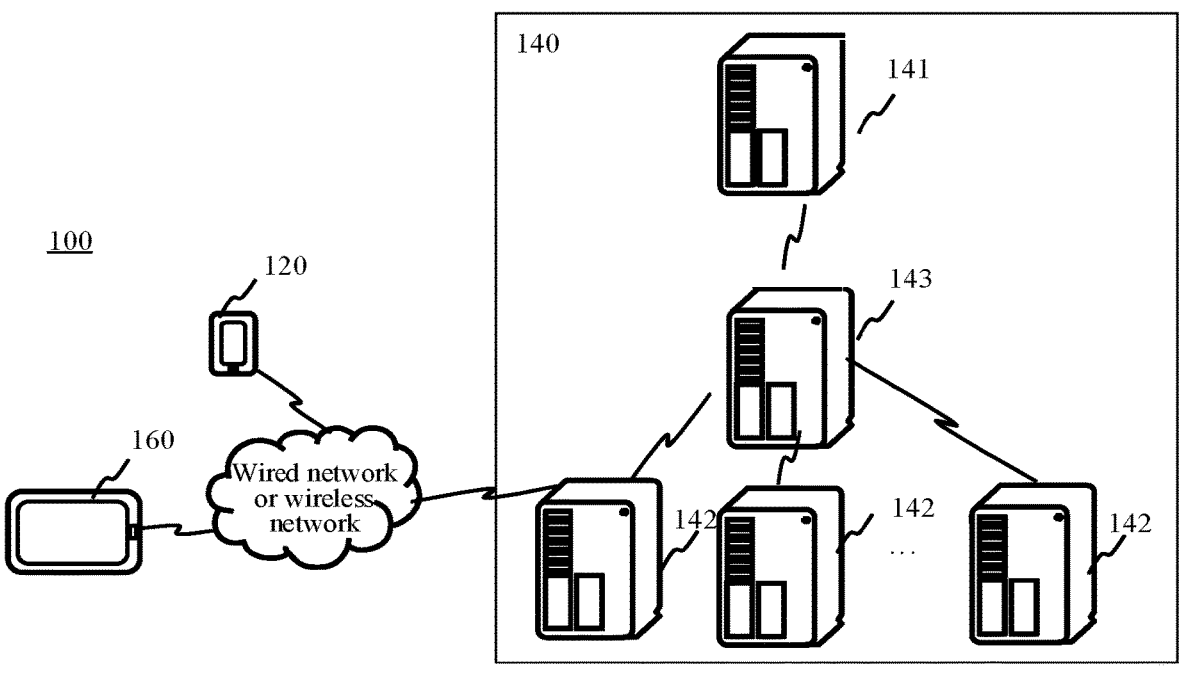
FIG. 1 is a schematic diagram of a computer system provided by an embodiment of the present disclosure.

FIG. 1 is a structural block diagram of a computer system provided by an exemplary embodiment of the present disclosure. The system further 100 includes: a first terminal 120, a server cluster 140, and a second terminal 160.

The terminal 120 is installed with a client supporting a game battle. The client may be any of an MMOG game, a board game, a MOBA (Multiplayer Online Battle Arena) game, a SLG (Simulation Game, a strategy game), a virtual reality application program, a three-dimensional map program, FPS (First-Person Shooting game) game, and a multiplayer shootout survival game. The first terminal 120 is a terminal used by a first user, and the first user uses the first terminal 120 to operate a virtual object under a first user account.

The first terminal 120 may be connected to the server cluster 140 through a wireless network or a wired network.

The server cluster 140 includes at least one selected from a server, multiple servers, a cloud computing platform, and a virtualization center. The server cluster 140 is configured to provide a background service for the client supporting the game battle on the first terminal 120. In one embodiment, the server cluster 140 undertakes primary computing work, and the first terminal 120 and the second terminal 160 undertake secondary computing work; or, the server cluster 140 undertakes secondary computing work, and the first terminal 120 and the second terminal 160 undertake primary computing work; or, the server cluster 140, the first terminal 120, and the second terminal 160 perform cooperative computing by using a distributed computing architecture. In one embodiment, the server cluster 140 includes a scheduling server 141 for scheduling a logic server 142, and the logic servers 142 for managing resources in different sub-maps in a game map. The server cluster 140 includes at least two logic servers 142. In one embodiment, the server cluster 140 further includes a proxy server 143 connected to the scheduling server 141 and the logic servers 142, and the proxy server 143 is configured to forward information between the scheduling server 141 and the logic server 142. As an example, the scheduling server 141 transmits first information to the proxy server 143, the proxy server 143 then forwards the first information to at least two logic servers 142, or, the scheduling server 141 receives second information forwarded by the proxy server 143, the second information being information provided by the at least two logic servers 142 to the proxy server 143.

The second terminal 160 is equipped with a client supporting a game battle. The client may be any of an MMOG game, a board game, an MOBA game, an SLG game, a virtual reality application program, a three-dimensional map program, an FPS game, and a multiplayer shootout survival game. The second terminal 160 is a terminal used by a second user, and the second user uses the second terminal 160 to operate a virtual object under a second user account. The first user account and the second user account may belong to different teams, different organizations, have no friend relationship, or have temporary communication authority.

In one embodiment, the clients installed on the first terminal 120 and the second terminal 160 may be the same, or the same type of application of different platforms. The first terminal 120 may generally refer to one of multiple terminals, and the second terminal 160 may generally refer to one of multiple terminals. In this embodiment, only the first terminal 120 and the second terminal 160 are exemplified. The device types of the first terminal 120 and the second terminal 160 may be the same or different, and the device types include but are not limited to: at least one selected from a smart phone, a tablet computer, an E-book reader, an MP3 player, an MP4 player, a laptop computer, and a desk computer.

Figure 2:
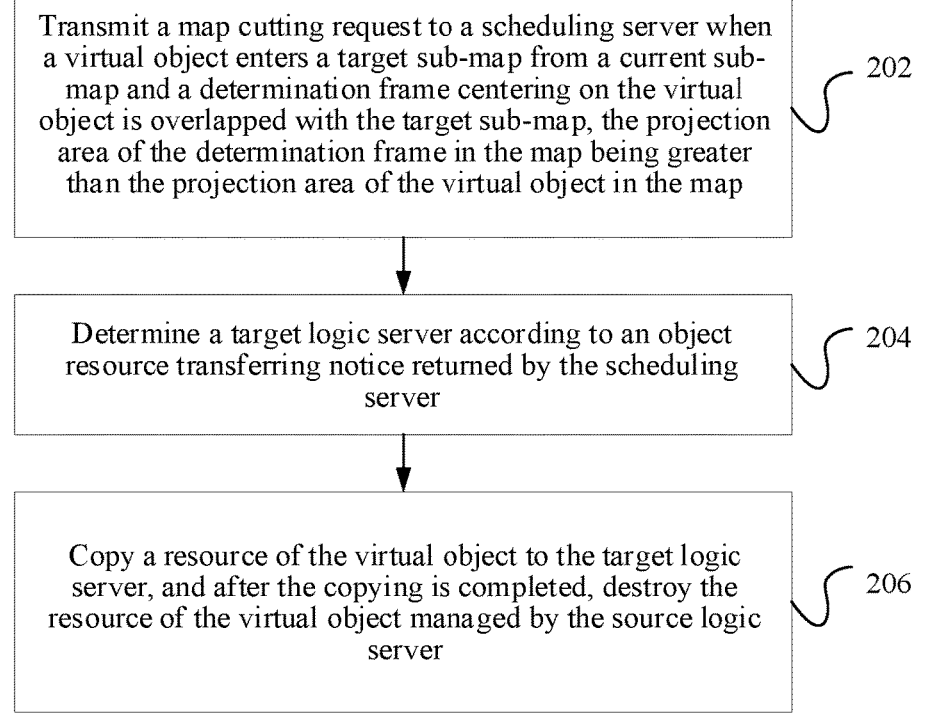
FIG. 2 is a schematic flowchart of a method for transferring a virtual object between maps provided by an embodiment of the present disclosure.

FIG. 2 is a schematic flowchart of a method for transferring a virtual object between maps provided by an exemplary embodiment of the present disclosure. The method is executed by a source logic server of at least two logic servers 142, the source logic server is connected to a scheduling server 141, the source logic server is configured to manage a resource of each virtual object in a current sub-map, and the scheduling server 141 is connected to the at least two logic servers 142.

Step 202: Transmit a map cutting request to a scheduling server, when a virtual object enters a target sub-map from the current sub-map and a determination frame centering on the virtual object is overlapped with the target sub-map, the projection area of the determination frame in a map being greater than the projection area of the virtual object in the map.

A logic server is configured to manage a resource of a virtual object in different sub-maps in the map. In one embodiment, a resource of a virtual object refer to state data of the virtual object. As an example, the state data may record at least one selected from a state value, a clothing, a skill, an appearance, a life value, a hunger value, and a cold value of the virtual object. For example, a virtual object holds a skill A, and state data B of the virtual object records the information that the virtual object holds the skill A. For another example, a virtual object is equipped with a windbreaker, and state data C of the virtual object records the information that the virtual object is equipped with the windbreaker. As an example, state data may further record at least one selected from an identifier, a name, a type, a camp, and a serial number of a virtual object. For example, a virtual object belongs to a "human" camp, and the state data records that the virtual object belongs to a "human" through a section of data sequence. For another example, a name of a virtual object is "Zhang San", and the state data is used for recording the name of the virtual object.

In one embodiment, a resource of a virtual object refers to a program code required to control activities of the virtual object. The activities here include at least one selected from moving, shooting, defending, skill releasing, item buying and selling, virtual resource collecting, walking, jumping, flying, swimming and crawling. As an example, a program code includes, but is not limited to, at least one selected from a program section, a decision tree, a behavior tree, an AI (Artificial Intelligence) model, a program set, and an instruction set. For example, a function implemented by a program section A is to control a virtual object to move at a constant speed. For another example, a function implemented by an AI model B is to control a virtual object to find a path automatically. For another example, a function of a behavior tree C is to control a virtual object to automatically seek an enemy and automatically attack.

Notably, the above resource of a virtual object does not include a map resource. The map resource includes, but is not limited to, at least one selected from a terrain of a map, collectable resources in the map, a size of the map, a number of the map, an architecture in the map, a scenic spot in the map and a natural landscape in the map. For example, a collectable flower is set in a map, and the flower can be regarded as the aforementioned map resource. For another example, a hill is set in the map, and the hill can be regarded as the aforementioned map resource.

The map is a map of any one program in an MMOG game, a board game, an MOBA game, an SLG game, a virtual reality application program, a three-dimensional map program, an FPS game and a multiplayer shootout survival game. As an example, a map is a map in an MMOG game, the map is composed of multiple sub-maps, and each sub-map is charged by a different logic server.

Figure 3:
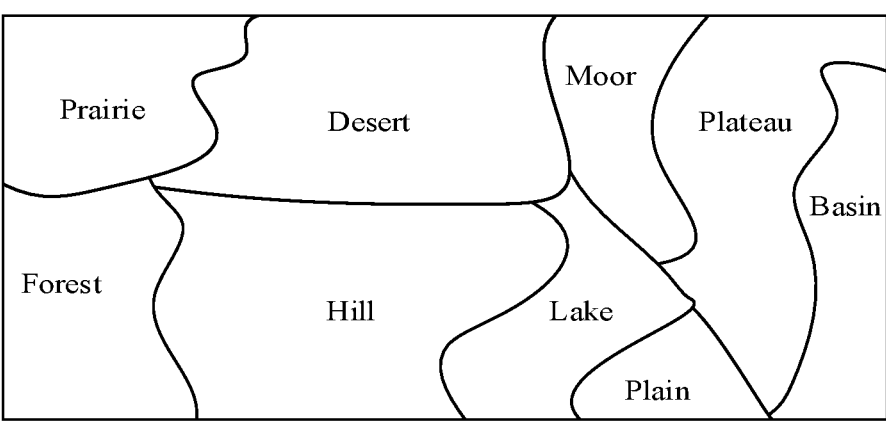
FIG. 3 is a schematic map diagram provided by an embodiment of the present disclosure.

In one embodiment, a sub-map in a map is obtained by random dividing; or, a sub-map in a map is obtained by uniform dividing; or, a sub-map in a map is obtained by dividing according to a map environment type, a map environment type is used for describing an environment of the sub-map, and in one embodiment, a map environment type includes at least one selected from a plain, a hill, a mountain, an ocean, a lake, a river, a desert and a custom environment. As an example, as shown in FIG. 3, a map is divided according to map environment types to obtain multiple sub-maps. In one embodiment, a map can be divided into sub-maps by using a coloring method. The coloring method refers to use of different colors to fill different areas in the map to divide the sub-maps according to filling colors.

A sub-map charged by each logic server may be divided and determined by a scheduling server. As an example, a map is divided into k sub-maps, and k is an integer greater than 1; a sub-map loading request is transmitted to N logic servers, the sub-map loading request is used for notifying the N logic servers to respectively load map resources of the k sub-maps, N is an integer greater than 1, and k and N can be equal or unequal. As an example, five sub-maps and four logic servers exist, one logic server corresponds to two sub-maps, and the remaining three logic servers are in one-to-one mapping with the sub-maps. As an example, four sub-maps and five logic servers exist, two logic servers correspond to the same sub-map, and the remaining three logic servers are in one-to-one mapping with the sub-maps. The scheduling server may randomly divide the map into k sub-maps; or, the scheduling server may also uniformly divide the map into k sub-maps; or, the scheduling server may also divide the map into k sub-maps according to map environment types.

A projection area of a determination frame in the map is greater than the projection area of a virtual object in the map.

Figure 4:
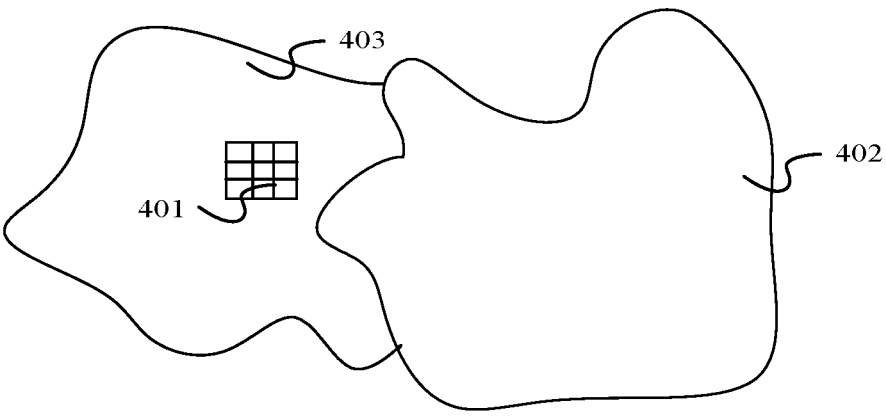
FIG. 4 is a schematic diagram for enabling a virtual object to pass through a sub-map provided by an embodiment of the present disclosure.
Figure 5:
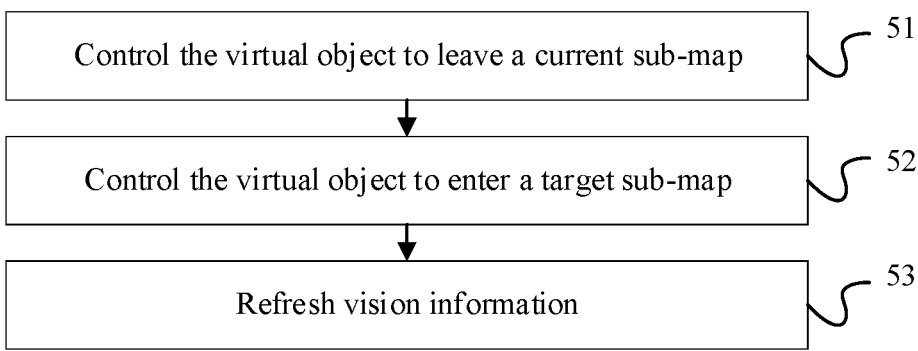
FIG. 5 is a schematic flowchart of a vision refreshing method provided by an embodiment of the present disclosure.

In one embodiment of the present disclosure, a determination frame is an m-rectangle grid centering on a virtual object, and m is a positive integer. As an example, as shown in FIG. 4, after a nine-rectangle grid 401 centering on a virtual object completely enter a target sub-map 403 from a current sub-map 402, a source logic server transmits a map cutting request to a scheduling server, and the central rectangle of the nine-rectangle grid 401 includes the virtual object.

In one embodiment of the present disclosure, a determination frame is a rectangle with a virtual object as a geometric center.

In another embodiment of the present disclosure, a determination frame is a circle centering on a virtual object.

In another embodiment of the present disclosure, a determination frame is a regular hexagon with a virtual object as a geometric center. Of course, a determination frame may further be another shape with a virtual object as a center, which is not limited in embodiments of the present disclosure.

Step 204: Determine a target logic server according to an object resource transferring notice returned by the scheduling server.

The object resource transferring notice is used for indicating the target logic server to the source logic server. The target logic server corresponds to the target sub-map.

In one embodiment, an object resource transferring notice includes the IP (Internet Protocol Address) of a target logic server.

In one embodiment, an object resource transferring notice includes an identification code of a target logic server. A source logic server stores a corresponding relationship between the identification code of the logic server and the IP of the logic server. As an example, a source logic server determines an IP of a target logic server according to an identification code of the target logic server and a corresponding relationship between the stored identification code and the IP.

Step 206: Copy a resource of the virtual object to the target logic server, and after the copying is completed, destroy the resource of the virtual object managed by the source logic server.

In one embodiment, a source logic server transmits a copying request to a target logic server. After receiving a copying permission returned by the target logic server, the source logic server copies the resource of the virtual object to the target logic server. After the source logic server completes a step of copying the resource of the virtual object to the target logic server, the resource of the virtual object managed by the source logic server itself is destroyed.

In one embodiment, a virtual object uses an object identifier, and the object identifier is in one-to-one mapping with the virtual object. For example, a virtual object 1 uses an object identifier A, and a virtual object 2 uses an object identifier B. At this time, a source logic server copies a resource of a virtual object using an object identifier to a target logic server, and destroys the resource of the virtual object using the object identifier managed by the source logic server.

In one embodiment, after a step of copying a resource of a virtual object to a target logic server and destroying the resource of the virtual object managed by a source logic server is completed, the target logic server takes over management of the resource of the virtual object. For example, at the beginning, a resource of a virtual object is performed on a source logic server, and after a step of copying the resource of the virtual object to a target logic server and destroying the resource of the virtual object managed by the source logic server is completed, the resource of the virtual object is no longer managed by the source logic server, but is managed by the target logic server. Notably, the above step 206 may be completed in a very short time (for example, within 1 to 2 microseconds), and an impact on a client is negligible.

In one embodiment, when a client communicates with a logic server, a resource of a virtual object obtained from between a source logic server and a target logic server each carries the above object identifier. At this time, the client will regard virtual objects obtained from the source logic server and the target logic server as the same virtual object, and an image of a virtual object on the client will not be refreshed, so a user will not observe flickering of the virtual object. As an example, a step of updating vision information of a virtual object at a client includes the following.

Step 51: Control the virtual object to leave a current sub-map.

In one embodiment, a user controls the virtual object to leave the current sub-map through a mobile control on the client, or the user controls the virtual object to leave the current sub-map through a keyboard, or the user controls the virtual object to leave the current sub-map through a joystick on a handle.

Step 52: Control the virtual object to enter a target sub-map.

Similar to step 51, the user controls the virtual object to enter the target sub-map through the mobile control on the client, or the user controls the virtual object to enter the target sub-map through the keyboard, or the user control the virtual object into the target sub-map through the joystick on the handle.

Step 53: Refresh vision information.

In one embodiment, a map resource of a map is pre-stored on a client. The map resource refers to a virtual resource other than a resource related to a virtual object. For example, a collectable flower is set in a map, and the flower can be regarded as the aforementioned map resource. For another example, a hill is set in the map, and the hill can be regarded as the aforementioned map resource. It is to be understood that on a client, when a user controls a virtual object to move to a boundary between a first sub-map and a second sub-map, as a map resource of a map is pre-stored on the client, at this time, the user can simultaneously observe map resources of the first sub-map and the second sub-map on the client, and for example, the user can observe a river in the first sub-map and a mountain in the second sub-map.

In one embodiment, vision information is refreshed after a source logic server copies a resource of a virtual object to a target logic server and after the resource of the virtual object managed by the source logic server is destroyed. As an example, on a client, when a virtual object controlled by a user is located in a first sub-map, the user can observe a map resource in a second sub-map, but the user cannot observe a virtual object existing in the second sub-map. After the user controls the virtual object to enter the second sub-map, vision information is refreshed, and the virtual object in the second sub-map is refreshed.

As a resource of a virtual object obtained from between a source logic server and a target logic server each carries the same object identifier when a client communicates with a logic server. the image of the virtual object on the client will not be refreshed, so a user will not observe flickering of the virtual object.

In one embodiment, when a current sub-map reaches an upper limit of a resource loading amount, the current sub-map includes at least two map blocks, and a virtual object transferring request is transmitted to a scheduling server when the current sub-map reaches the upper limit of the resource loading amount; according to a virtual object transferring notice returned by the scheduling server, a resource of each virtual object in a first map block of the at least two map blocks is copied to a resource receiving logic server, and after the copying is completed, the resource of each virtual object of the first map block managed by the source logic server is destroyed.

In one embodiment, a quantity of virtual objects included in each of the at least two map blocks is determined; a map block including the largest quantity of virtual objects is determined as a first map block. In one embodiment, a first map block is determined from the at least two map blocks according to a number sequence of the at least two map blocks. In one embodiment, a first map block is randomly determined from the at least two map blocks.

In this manner, when a virtual object passes through a sub-map, a resource of the virtual object managed by a source logic server is copied to a target logic server, and after the copying is completed, the resource of the virtual object managed by the source logic server is destroyed. When a virtual object moves back and forth between a current sub-map and a target sub-map, compared with existing technologies, a resource of the virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

FIG. 6 is a schematic flowchart of a method for transferring a virtual object between maps provided by an exemplary embodiment of the present disclosure. The method is executed by a source logic server of at least two logic servers 142, the source logic server is connected to a scheduling server 141, the source logic server is configured to manage a resource of each virtual object in a current sub-map, and the scheduling server 141 is connected to the at least two logic servers 142.

Step 601: Set a determination frame centering on a virtual object.

In one embodiment of the present disclosure, a determination frame is an m-rectangle grid centering on a virtual object, and m is a positive integer. As an example, as shown in FIG. 4, after a nine-rectangle grid 401 centering on a virtual object completely enter a target sub-map 403 from a current sub-map 402, a source logic server transmits a map cutting request to a scheduling server, and the central rectangle of the nine-rectangle grid 401 is configured to indicate a position of the virtual object.

In one embodiment of the present disclosure, a determination frame is a rectangle with a virtual object as a geometric center.

In another embodiment of the present disclosure, a determination frame is a circle centering on a virtual object.

In another embodiment of the present disclosure, a determination frame is a regular hexagon with a virtual object as a geometric center. Notably, a specific shape of a determination frame can be set and modified by a person skilled in the art according to an actual requirement.

In one embodiment, a determination frame is set according to coordinates of a virtual object. As an example, coordinates of a virtual object are (0, 0), and according to the coordinates, it is determined that four vertices of the determination frame are (2, 2), (2, −2), (−2, 2) and (−2, −2). These four vertices are connected in sequence to obtain a rectangular determination frame.

Step 602: Determine, in a process of moving the virtual object from the current sub-map to the target sub-map, when the determination frame has overlapping areas with both the current sub-map and the target sub-map, that the virtual object enters the target sub-map from the current sub-map.

Figure 7:
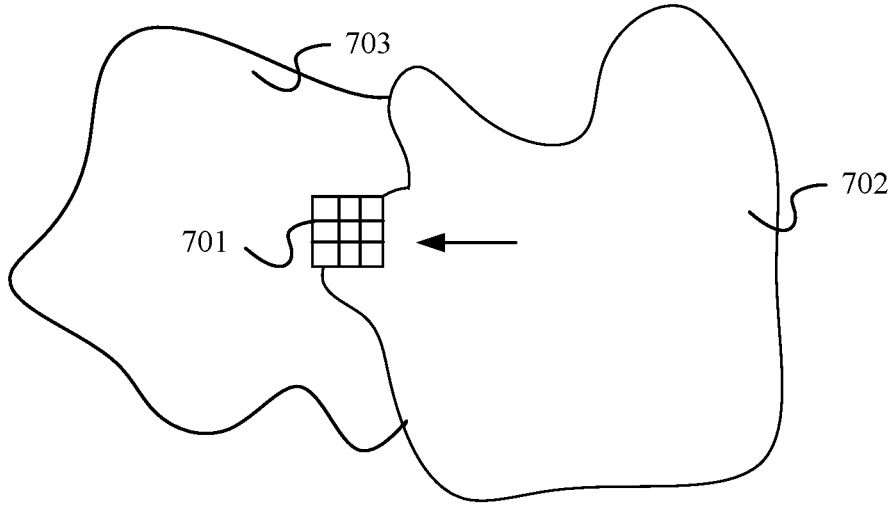
FIG. 7 is a schematic map diagram provided by an embodiment of the present disclosure.

As an example, as shown in FIG. 7, taking a determination frame being a nine-rectangle grid 701 as an example for description, as the nine-rectangle grid 701 will occupy a certain projection area in a target map, when a virtual object moves from a current sub-map 702 to a target sub-map 703, the nine-rectangle grid 701 will have overlapping areas with both the current sub-map 702 and the target sub-map 703 simultaneously, at this time, it can be considered that the virtual object is performing an action of entering the target sub-map 703 from the current sub-map 702, but it cannot be guaranteed that the virtual object has completely entered the target sub-map 703 at this time.

Step 603: Transmit, when the determination frame completely falls into the target sub-map, a map cutting request to the scheduling server.

As the virtual object enters the target sub-map from the current sub-map, a map cutting request is transmitted to the source logic server when the determination frame completely falls into the target sub-map.

In one embodiment, in a process of enabling the virtual object to enter the target sub-map from the current sub-map, whether the determination frame completely falls into the target sub-map is determined according to a boundary relationship between the determination frame and the current sub-map and the target sub-map. For example, in a process of enabling the virtual object to enter the target sub-map from the current sub-map, when the boundary relationship between the determination frame and the current sub-map and the target sub-map is changed from intersection to non-intersection, it is considered that the determination frame completely falls into the target sub-map.

In one embodiment, in a process of enabling the virtual object to enter the target sub-map from the current sub-map, whether the determination frame completely falls into the target sub-map is determined according to a distance between a point in the determination frame and the boundary between the current sub-map and the target sub-map.

Step 604: Determine a target logic server according to an object resource transferring notice returned by the scheduling server.

An object resource transferring notice is used for providing a target logic server to the source logic server. The target logic server corresponds to the target sub-map.

In one embodiment, an object resource transferring notice includes an IP of the target logic server.

In one embodiment, an object resource transferring notice includes an identification code of a target logic server. A source logic server stores a corresponding relationship between the identification code of the logic server and the IP of the logic server. As an example, a source logic server determines an IP of a target logic server according to an identification code of the target logic server and a corresponding relationship between the stored identification code and the IP.

Step 605: Copy a resource of the virtual object to the target logic server, and after the copying is completed, destroy the resource of the virtual object managed by the source logic server.

An upper limit of the quantity of virtual objects managed by the source logic server usually exists, due to the reason that an upper limit of computing power of the source logic server exists, an upper limit of virtual objects managed by the source logic server at the same time also exists. In one embodiment, the current sub-map includes at least two map blocks, and a virtual object transferring request is transmitted to the scheduling server when the current sub-map reaches an upper limit of a resource loading amount; according to a virtual object transferring notice transmitted by the scheduling server, the resource of each virtual object in a first map block of the at least two map blocks is copied to a resource receiving logic server, and after the copying is completed, the resource of each virtual object in the first map block managed by the source logic server is destroyed.

In one embodiment, the quantity of virtual objects included in each of the at least two map blocks is determined; a map block including the largest quantity of virtual objects is determined as a first map block. In one embodiment, a first map block is determined from the at least two map blocks according to a number sequence of the at least two map blocks. In one embodiment, a first map block is randomly determined from the at least two map blocks.

When a virtual object in the embodiment passes through a sub-map, a resource of the virtual object managed by a source logic server is copied to a target logic server, and after the copying is completed, the resource of the virtual object managed by the source logic server is destroyed. When a virtual object moves back and forth between a current sub-map and a target sub-map, compared with existing technologies, a resource of the virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

In addition, according to the method for setting a determination frame provided by the embodiment can conveniently and quickly determine whether a virtual object has completely entered a target sub-map, and has a small amount of calculation and good real-time performance.

Figure 8:
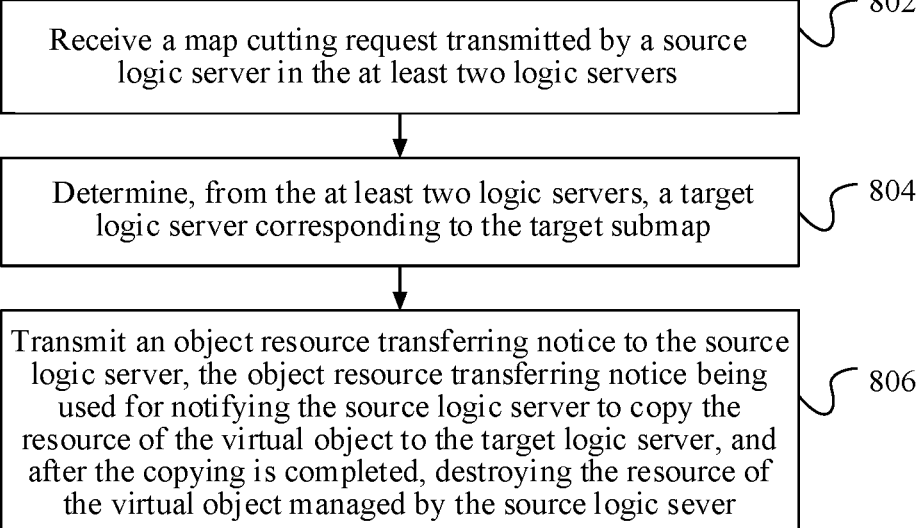
FIG. 8 is a schematic flowchart of a method for transferring a virtual object between maps provided by an embodiment of the present disclosure.

FIG. 8 is a schematic flowchart of a method for transferring a virtual object between maps provided by an exemplary embodiment of the present disclosure. The method is executed by a scheduling server 141, the scheduling server 141 is connected to at least two logic servers 142, and the at least two logic servers 142 are configured to manage a resource of each virtual object in a sub-map.

Step 802: Receive a map cutting request transmitted by a source logic server in the at least two logic servers.

The map cutting request is transmitted by the source logic server to the scheduling server when a virtual object enters a target sub-map from a current sub-map and a determination frame centering on the virtual object is overlapped with the target sub-map, and the current sub-map corresponds to the source logic server.

A logic server is configured to manage a resource related to the virtual object in a different sub-map in a map. For example, a first logic server is responsible for processing activities of all virtual objects in a first sub-map. The activities here include at least one selected from moving, shooting, defending, skill releasing, item buying and selling, virtual resource collecting, walking, jumping, flying, swimming and crawling.

The map is a map of any one program in an MMOG game, a board game, an MOBA game, an SLG game, a virtual reality application program, a three-dimensional map program, an FPS game and a multiplayer shootout survival game. As an example, a map is a map in an MMOG game, the map is composed of multiple sub-maps, and each sub-map is charged by a different logic server.

In one embodiment, a sub-map in a map is obtained by random dividing; or, a sub-map in a map is obtained by uniform dividing; or, a sub-map in a map is obtained by dividing according to a map environment type, a map environment type is used for describing an environment of the sub-map, and in one embodiment, a map environment type includes at least one selected from a plain, a hill, a mountain, an ocean, a lake, a river, a desert and a custom environment. As an example, as shown in FIG. 3, a target map is divided according to map environment types to obtain multiple sub-maps.

In one embodiment, a map is divided into sub-maps by using a coloring method. The coloring method refers to use of different colors to fill different areas in the map to divide the sub-maps according to filling colors.

A sub-map charged by each logic server may be divided and determined by a scheduling server. As an example, a map is divided into k sub-maps, and k is an integer greater than 1; a sub-map loading request is transmitted to N logic servers, the sub-map loading request is used for notifying the N logic servers to respectively load map resources of the k sub-maps, N is an integer greater than 1, and k and N can be equal or unequal. As an example, five sub-maps and four logic servers exist, one logic server corresponds to two sub-maps, and the remaining three logic servers are in one-to-one mapping with the sub-maps. As an example, four sub-maps and five logic servers exist, two logic servers correspond to the same sub-map, and the remaining three logic servers are in one-to-one mapping with the sub-maps. The scheduling server may randomly divide the map into k sub-maps; or, the scheduling server may also uniformly divide the map into k sub-maps; or, the scheduling server may also divide the map into k sub-maps according to map environment types.

In one embodiment of the present disclosure, a map cutting request is transmitted by a source logic server to a scheduling server when an m-rectangle grid with a virtual object as a geometric center completely falls into a target sub-map, and m is a positive integer. As an example, as shown in FIG. 4, after a nine-rectangle grid 401 centering on a virtual object completely enters a target sub-map 403 from a current sub-map 402, a source logic server transmits a map cutting request to a scheduling server.

In one embodiment of the present disclosure, a map cutting request is transmitted by a source logic server to a scheduling server when a rectangle with a virtual object as a geometric center completely falls into a target sub-map.

In another embodiment of the present disclosure, a map cutting request is transmitted by a source logic server to a scheduling server when a circle with a virtual object as a circle center completely falls into a target sub-map.

In another embodiment of the present disclosure, a map cutting request is transmitted by a source logic server to a scheduling server when a regular hexagon with a virtual object as a geometric center completely falls into a target sub-map.

Step 804: Determine, from the at least two logic servers, a target logic server corresponding to the target sub-map.

In one embodiment, the scheduling server stores the corresponding relationship between a sub-map and a logic server. The scheduling server may determine a target logic server corresponding to the target sub-map from the at least two logic servers according to the aforementioned corresponding relationship.

In one embodiment of the present disclosure, there is no logic server to manage a target sub-map, and in this case, the target sub-map needs to be created on a logic server. As an example, when a logic server corresponding to a target sub-map does not exist in at least two logic servers, a first logic server is determined from the at least two logic servers; a first map creation notice is transmitted to the first logic server, the first map creation notice being used for notifying the first logic server to create a target sub-map; and when a first map creation completion notice returned by the first logic server is received, the first logic server is determined as a target logic server.

In one embodiment of the present disclosure, there is an upper limit of a resource loading amount of a logic server, the resource loading amount refers to quantity of virtual objects managed by the logic server, and when the logic server corresponding to a target sub-map reaches the upper limit of the resource loading amount, the logic server cannot continue to receive new virtual objects, and thus, the target sub-map needs to be created on another logic server. As an example, when a logic server corresponding to a target sub-map in at least two logic servers reaches an upper limit of a resource loading amount, a second logic server is determined from the at least two logic servers; a second map creation notice is transmitted to the second logic server, the second map creation notice being used for notifying the second logic server to create a target sub-map; and determine the second logic server as a target logic server when a second map creation completion notice returned by the second logic server is received.

In one embodiment of the present disclosure, when a logic server corresponding to a target sub-map exists in at least two logic servers, a scheduling server may directly determine a logic server corresponding to the target sub-map as a target logic server.

Step 806: Transmit an object resource transferring notice to the source logic server, the object resource transferring notice being used for notifying the source logic server to copy the resource of the virtual object to the target logic server, and after the copying is completed, destroying the resource of the virtual object managed by the source logic server.

In one embodiment, a virtual object uses an object identifier, and the object identifier is in one-to-one mapping with the virtual object. For example, a virtual object 1 uses an object identifier A, and a virtual object 2 uses an object identifier B. At this time, an object resource transferring notice is used for notifying a source logic server to copy a resource of a virtual object using an object identifier to a target logic server, and after the copying is completed, destroying the resource of the virtual object using an object identifier managed by the source logic server.

In one embodiment, after a step of copying a resource of a virtual object to a target logic server and destroying the resource of the virtual object managed by a source logic server is completed, the target logic server takes over management of the resource of the virtual object. For example, at the beginning, a resource of a virtual object is managed on a source logic server, and after a step of copying the resource of the virtual object to a target logic server and destroying the resource of the virtual object managed by the source logic server is completed, the resource is no longer managed by the source logic server, but is managed by the target logic server. Notably, the above step 206 may be completed in a very short time (for example, within 1 to 2 microseconds), and an impact on a client is negligible.

In one embodiment, when a client communicates with a logic server, a resource of a virtual object obtained from between a source logic server and a target logic server each carries the above object identifier. At this time, the client will regard virtual objects obtained from the source logic server and the target logic server as the same virtual object, and an image of a virtual object on the client will not be refreshed, so a user will not observe flickering of the virtual object.

In one embodiment, a map resource of a map is pre-stored on a client. The map resource refers to a virtual resource other than a resource related to a virtual object. For example, a collectable flower is set in a map, and the flower can be regarded as the aforementioned map resource. For another example, a hill is set in the map, and the hill can be regarded as the aforementioned map resource. It is to be understood that on a client, when a user controls a virtual object to move to a boundary between a first sub-map and a second sub-map, as a map resource of a map is pre-stored on the client, at this time, the user can simultaneously observe map resources of the first sub-map and the second sub-map on the client, and for example, the user can observe a river in the first sub-map and a mountain in the second sub-map.

In one embodiment, vision information is refreshed after a source logic server copies a resource of a virtual object to a target logic server and after the resource of the virtual object managed by the source logic server is destroyed. As an example, on a client, when a virtual object controlled by a user is located in a first sub-map, the user can observe a map resource in a second sub-map, but the user cannot observe a virtual object existing in the second sub-map. After the user controls the virtual object to enter the second sub-map, vision information is refreshed, and the virtual object in the second sub-map is refreshed.

As a resource of a virtual object obtained from between a source logic server and a target logic server each carries the same object identifier when a client communicates with a logic server. the image of the virtual object on the client will not be refreshed, so a user will not observe flickering of the virtual object.

In one embodiment, when a source logic server corresponding to a current sub-map reaches an upper limit of a resource loading amount, the current sub-map is splitted into a first current sub-map and a second current sub-map; a resource receiving logic server is determined from at least two logic servers; a virtual object transferring notice is transmitted to the source logic server, the virtual object transferring notice is used for notifying the source logic server to copy a resource of each virtual object in the first current sub-map to a resource receiving logic server, and after the copying is completed, destroying the resource of each virtual object in the first current sub-map managed by the source logic server.

When a virtual object passes through a sub-map, a resource of the virtual object managed by a source logic server is copied to a target logic server, and after the copying is completed, the resource of the virtual object managed by the source logic server is destroyed. Compared with existing technologies, a resource of a virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

FIG. 9 is a schematic flowchart of a method for transferring a virtual object between maps provided by an exemplary embodiment of the present disclosure. The method is executed by a scheduling server 141, and the scheduling server 141 is connected to at least two logic servers 142.

Step 901: Receive a map cutting request transmitted by a source logic server.

The source logic server refers to a logic server processing a current sub-map, the current sub-map being a sub-map where the virtual object is located.

In another embodiment of the present disclosure, a map cutting request is transmitted by a source logic server to a scheduling server when an m-rectangle grid centering on a virtual object completely falls into a target sub-map, and m is a positive integer.

In one embodiment of the present disclosure, a map cutting request is transmitted by a source logic server to a scheduling server when a rectangle with a virtual object as a geometric center completely falls into a target sub-map.

In another embodiment of the present disclosure, a map cutting request is transmitted by a source logic server to a scheduling server when a circle with a virtual object as a circle center completely falls into a target sub-map.

In another embodiment of the present disclosure, a map cutting request is transmitted by a source logic server to a scheduling server when a regular hexagon with a virtual object as a geometric center completely falls into a target sub-map.

In one embodiment, a source logic server may forward a map cutting request to a scheduling server through a proxy server.

Step 902: Determine the virtual object to move to a target sub-map from the current sub-map according to the map cutting request.

The target sub-map refers to a sub-map that the virtual object enters.

Step 903: Determine, when a logic server corresponding to the target sub-map does not exist in at least two logic servers, a resource loading amount of the target sub-map.

The resource loading amount refers to a quantity of virtual objects existing on a sub-map. As an example, a resource loading amount of a target sub-map indicates that there may be 100 virtual objects on the target sub-map.

Step 904: Transmit a resource query request to at least two logic servers in a multicast manner.

The resource query request is used for querying a respective remaining resource loading amount of each logic server. Each logic server has a resource loading upper limit, the resource loading upper limit refers to an upper limit of the quantity of virtual objects in a sub-map, and the resource loading upper limit is equal to a remaining resource loading amount plus a used resource loading amount.

Step 905: Determine a first logic server according to resource query feedbacks returned by at least two logic servers.

In one embodiment, resource query feedbacks include remaining resource loading amounts of at least two logic servers.

In one embodiment, a logic server with the largest remaining resource loading amount in the at least two logic servers is determined as a first logic server.

In one embodiment, a logic server with the remaining resource loading amount reaching a resource loading amount threshold in at least two logic servers is determined as a first logic server.

Step 906: Transmit a first map creation notice to the first logic server.

The first map creation notice is used for notifying the first logic server to create a target sub-map.

In one embodiment, after receiving the first map creation notice, the first logic server loads a map resource of the target sub-map. As an example, a first logic server downloads a map resource of a target sub-map from a resource server, the resource server being a server for storing a map resource of each sub-map.

Step 907: Determine, when a first map creation completion notice transmitted by the first logic server is received, the first logic server as a target logic server.

The first map creation completion notice is transmitted by the first logic server to the scheduling server after the first logic server creates the target sub-map.

The first map creation completion notice is used for indicating that the first logic server has completed creation of the target sub-map.

Step 908: Transmit an object resource transferring notice to the source logic server.

The object resource transferring notice is used for notifying the source logic server to copy the resource of the virtual object to the target logic server, and after the copying is completed, destroying the resource of the virtual object managed by the source logic server.

When a virtual object passes through a sub-map, a resource of the virtual object managed by a source logic server is copied to a target logic server, and after the copying is completed, the resource of the virtual object managed by the source logic server is destroyed. Compared with existing technologies, a resource of a virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

Moreover, a new sub-map can be created, a large-area map can be realized in a game, maintenance is easy, and a design need for a seamless big world can be met.

Figure 10:
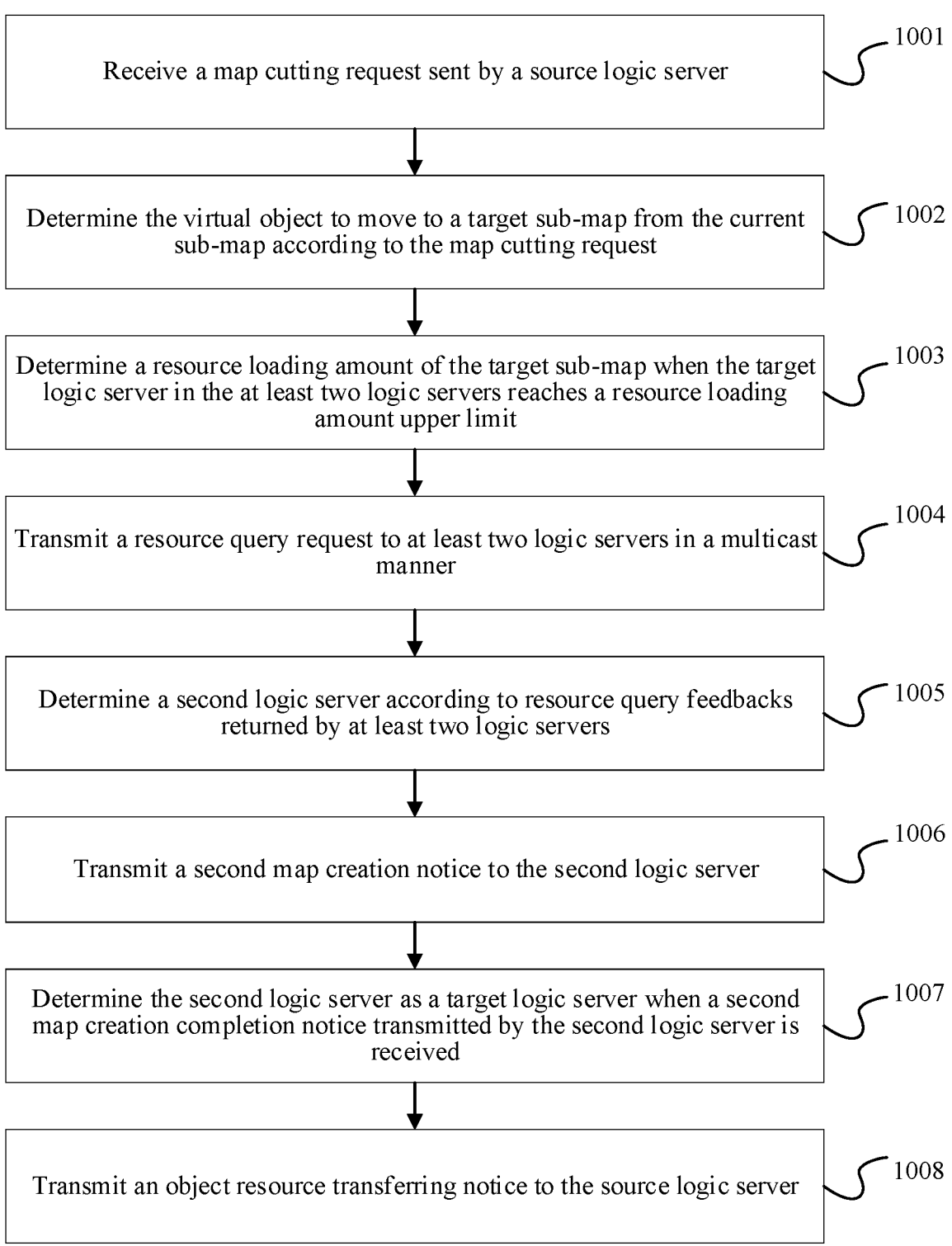
FIG. 10 is a schematic flowchart of a method for transferring a virtual object between maps provided by an embodiment of the present disclosure.

FIG. 10 is a schematic flowchart of a method for transferring a virtual object between maps provided by an exemplary embodiment of the present disclosure. The method is executed by a scheduling server 141, and the scheduling server 141 is connected to at least two logic servers 142.

Step 1001: Receive a map cutting request transmitted by a source logic server.

The source logic server refers to a logic server processing a current sub-map, the current sub-map being a sub-map where the virtual object is located.

In one embodiment of the present disclosure, a map cutting request is transmitted by a source logic server to a scheduling server when an m-rectangle grid centering on a virtual object completely falls into a target sub-map, and m is a positive integer.

In one embodiment of the present disclosure, a map cutting request is transmitted by a source logic server to a scheduling server when a rectangle with a virtual object as a geometric center completely falls into a target sub-map.

In another embodiment of the present disclosure, a map cutting request is transmitted by a source logic server to a scheduling server when a circle with a virtual object as a circle center completely falls into a target sub-map.

In another embodiment of the present disclosure, a map cutting request is transmitted by a source logic server to a scheduling server when a regular hexagon with a virtual object as a geometric center completely falls into a target sub-map.

Step 1002: Determine the virtual object to move to a target sub-map from the current sub-map according to the map cutting request.

The target sub-map refers to a sub-map that the virtual object is about to enter.

Step 1003: Determine a resource loading amount of the target sub-map when a logic server corresponding to the target sub-map in at least two logic servers reaches a resource loading amount upper limit.

The resource loading amount upper limit refers to quantity of virtual objects existing at most in a sub-map. As an example, a resource loading amount upper limit of the target sub-map indicates that at most 120 virtual objects exist in the target sub-map.

Step 1004: Transmit a resource query request to at least two logic servers in a multicast manner.

The resource query request is used for querying a remaining resource loading amount of each logic server. Each logic server has a resource loading upper limit, the resource loading upper limit refers to an upper limit of quantity of virtual objects existing at most in a sub-map, and the resource loading upper limit is equal to a remaining resource loading amount plus a used resource loading amount.

Step 1005: Determine a second logic server according to resource query feedbacks returned by at least two logic servers.

In one embodiment, resource query feedbacks include remaining resource loading amounts of at least two logic servers.

In one embodiment, a logic server with the largest remaining resource loading amount in at least two logic servers is determined as a second logic server.

In one embodiment, a logic server with a remaining resource loading amount reaching a resource loading amount threshold in at least two logic servers is determined as a second logic server.

Step 1006: Transmit a second map creation notice to the second logic server.

The second map creation notice is used for notifying the second logic server to create a target sub-map.

Step 1007: Determine the second logic server as a target logic server when a second map creation completion notice returned by the second logic server is received.

The second map creation completion notice is transmitted to a scheduling server after the second logic server creates a target sub-map.

The second map creation completion notice is used for indicating that the second logic server has completed creation of the target sub-map.

Step 1008: Transmit an object resource transferring notice to the source logic server.

The object resource transferring notice is used for notifying the source logic server to copy a resource of a virtual object to the target logic server, and after the copying is completed, destroying the resource of the virtual object on the source logic server.

When a virtual object passes through a sub-map, a resource of the virtual object managed by a source logic server is copied to a target logic server, and after the copying is completed, the resource of the virtual object managed by the source logic server is destroyed. Compared with existing technologies, a resource of a virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

Moreover, a new sub-map can be created when the computing power of the logic server is limited, and the burden of the logic server is reduced.

Figure 11:
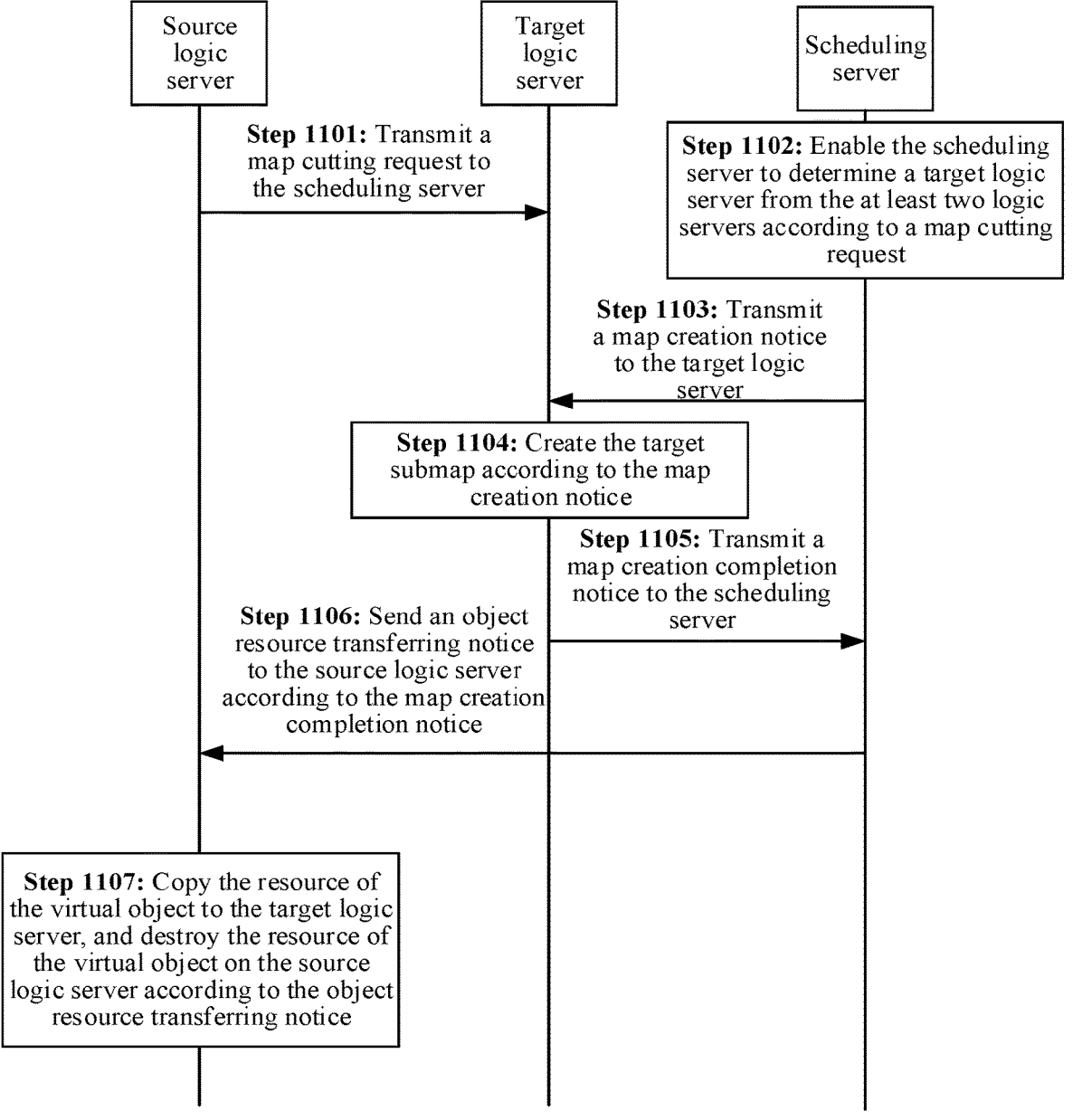
FIG. 11 is a schematic flowchart of a method for transferring a virtual object between maps provided by an embodiment of the present disclosure.
Figure 12:
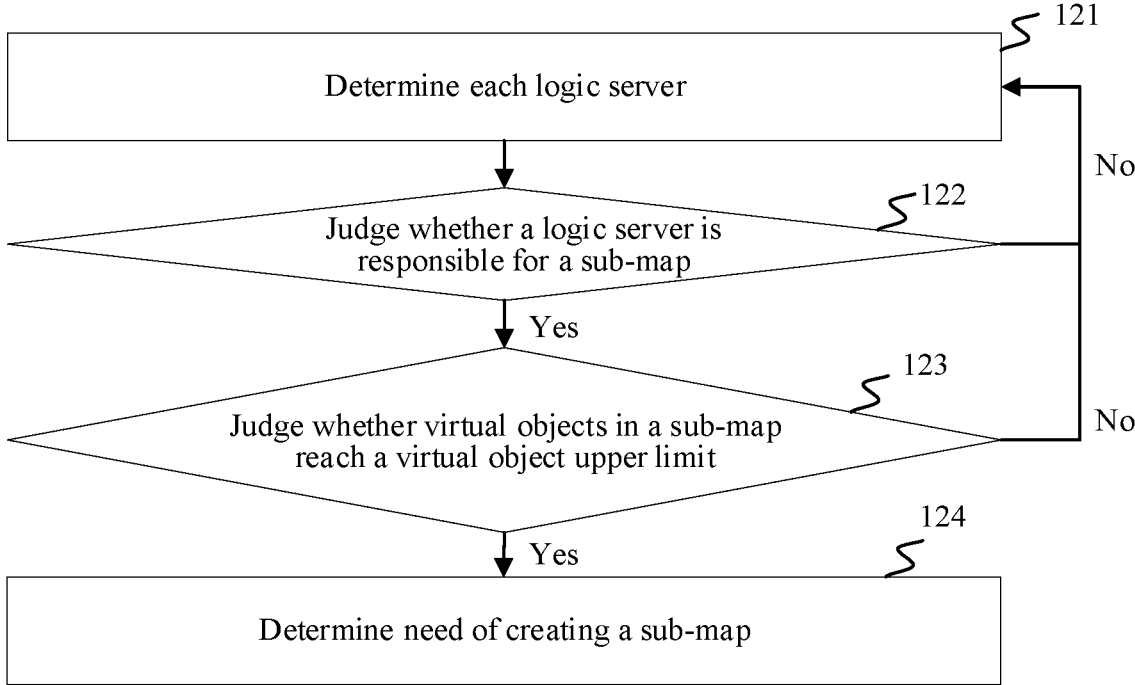
FIG. 12 is a schematic flowchart of a method for creating a sub-map provided by an embodiment of the present disclosure.

FIG. 11 is a schematic flowchart of a method for transferring a virtual object between maps provided by an exemplary embodiment of the present disclosure. The method is executed by a scheduling server 141, and the scheduling server 141 is connected to at least two logic servers 142.

Step 1101: Enable a source logic server to transmit a map cutting request to the scheduling server.

The source logic server refers to a logic server processing a current sub-map, the current sub-map being a sub-map where the virtual object is located.

In another embodiment of the present disclosure, a map cutting request is transmitted by a source logic server to a scheduling server when an m-rectangle grid centering on a virtual object completely falls into a target sub-map, and m is a positive integer.

In one embodiment of the present disclosure, a map cutting request is transmitted by a source logic server to a scheduling server when a rectangle with a virtual object as a geometric center completely falls into a target sub-map.

In another embodiment of the present disclosure, a map cutting request is transmitted by a source logic server to a scheduling server when a circle with a virtual object as a circle center completely falls into a target sub-map.

In another embodiment of the present disclosure, a map cutting request is transmitted by a source logic server to a scheduling server when a regular hexagon with a virtual object as a geometric center completely falls into a target sub-map.

Step 1102: Enable the scheduling server to determine a target logic server from the at least two logic servers according to a map cutting request.

In one embodiment, a scheduling server needs to judge whether there is a logic server corresponding to a target sub-map, and a scheduling server may check a remaining resource loading amount of each logic server at regular time, and may also check a remaining resource loading amount of each logic server when receiving a map cutting request. As an example, a process of enabling a scheduling server to determine whether a sub-map needs to be created includes following steps.

Step 121: Determine each logic server.

The scheduling server determines each logic server connected to the scheduling server.

Step 122: Judge whether a logic server is responsible for a sub-map.

When a logic server is responsible for a sub-map, step 123 is performed. When a logic server is not responsible for a sub-map, the method returns to step 121.

Step 123: Judge whether virtual objects in a sub-map reach a virtual object upper limit.

When virtual objects in a sub-map reach a virtual object upper limit, step 124 is performed. When virtual objects in a sub-map does not reach a virtual object upper limit, the method returns to step 121.

A virtual object upper limit may be determined by computing power of s logic server.

Step 124: Determine need of creating a sub-map.

Step 1103: Enable the scheduling server to transmit a map creation notice to the target logic server.

The map creation notice is used for notifying the target logic server to create a target sub-map.

Step 1104: Enable the target logic server to create the target sub-map according to the map creation notice.

In one embodiment, after receiving a map creation notice, a target logic server loads a map resource of a target sub-map. As an example, a target logic server downloads a map resource of a target sub-map from a resource server, the resource server being a server for storing a map resource of each sub-map.

Step 1105: Enable the target logic server to transmit a map creation completion notice to the scheduling server.

The map creation completion notice is used for indicating that the target logic server has completed a process of creating the target sub-map.

Step 1106: Enable the scheduling server to transmit an object resource transferring notice to the source logic server according to the map creation completion notice.

The object resource transferring notice is used for notifying the source logic server to copy a resource of a virtual object to the target logic server, and after the copying is completed, destroying the resource of the virtual object managed by the source logic server.

Step 1107: Enable the source logic server to copy the resource of the virtual object to the target logic server, and after the copying is completed, destroy the resource of the virtual object managed by the source logic server according to the object resource transferring notice.

In one embodiment, a virtual object uses an object identifier, and the object identifier is in one-to-one mapping with the virtual object. For example, a virtual object 1 uses an object identifier A, and a virtual object 2 uses an object identifier B. At this time, an object resource transferring notice is used for notifying a source logic server to copy a resource of a virtual object using an object identifier to a target logic server, and after the copying is completed, destroying the resource of the virtual object using an object identifier managed by the source logic server.

In one embodiment, when a client communicates with a logic server, a resource of a virtual object obtained from between a source logic server and a target logic server each carries the above object identifier. At this time, the client will regard virtual objects obtained from the source logic server and the target logic server as the same virtual object, and an image of a virtual object on the client will not be refreshed, so a user will not observe flickering of the virtual object.

When a virtual object passes through a sub-map, a resource of the virtual object managed by a source logic server is copied to a target logic server, and after the copying is completed, the resource of the virtual object managed by the source logic server is destroyed. Compared with existing technologies, a resource of a virtual object in the present disclosure only exists on one logic server, the resource does not need to be frequently synchronized between two logic servers, pressure of a logic server can be reduced, and the burden on the logic server is reduced.

The following describes apparatus embodiments of the present disclosure, applied for executing method embodiments of the present disclosure. For details not disclosed in the apparatus embodiments of the present disclosure, the method embodiments of the present disclosure may be referred to.

Figure 13:
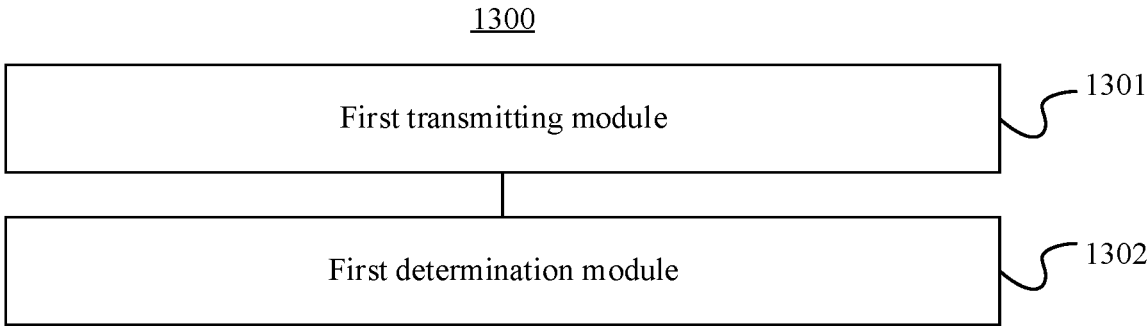
FIG. 13 is a schematic diagram of an apparatus for transferring a virtual object between maps provided by an embodiment of the present disclosure.

FIG. 13 is a block diagram of an apparatus for transferring a virtual object between maps provided by an embodiment of the present disclosure. The function may be implemented by hardware, or may be implemented by hardware executing corresponding software. The apparatus is connected to a scheduling server and is used for managing a resource of each virtual object in a current sub-map, and the scheduling server is connected to at least two logic servers. The apparatus 1300 includes: a first transmitting module 1301, configured to transmit a map cutting request to the scheduling server when the virtual object enters a target sub-map from the current sub-map and a determination frame centering on the virtual object is overlapped with the target sub-map, the projection area of the determination frame in the map being greater than the projection area of the virtual object in the map; a first determination module 1302, configured to determine a target logic server according to an object resource transferring notice returned by the scheduling server; and where the first transmitting module 1301 is further configured to copy a resource of a virtual object to the target logic server, and after the copying is completed, destroy the resource of the virtual object managed by the source logic server.

In an exemplary embodiment of the present disclosure, a first determination module 1302 is further configured to set a determination frame centering on a virtual object; in a process of moving the virtual object from the current sub-map to the target sub-map, when the determination frame has overlapping areas with both the current sub-map and the target sub-map, determining that the virtual object enters the target sub-map from the current sub-map; when the determination frame completely falls into the target sub-map, transmit a map cutting request to the source logic server.

In one exemplary embodiment of the present disclosure, a determination frame is an m-rectangle grid centering on a virtual object, and m is a positive integer; or, a determination frame is a rectangle with a virtual object as a geometric center. or, a determination frame is a circle with a virtual object as a circle center; or, a determination frame is a regular hexagon with a virtual object as a geometric center.

In one exemplary embodiment of the present disclosure, a virtual object uses an object identifier; and the first transmitting module 1301 is specifically configured to copy a resource of a virtual object using an object identifier to a target logic server, and after the copying is completed, destroy the resource of the virtual object using the object identifier managed by the source logic server.

In one exemplary embodiment of the present disclosure, a current sub-map includes at least two map blocks, and the first transmitting module 1301 is further configured to transmit a virtual object transferring request to a scheduling server when the current sub-map reaches an upper limit of a resource loading amount; according to a virtual object transferring notice returned by the scheduling server, the resource of each virtual object on a first map block of the at least two map blocks is copied to a resource receiving logic server, and after the copying is completed, a resource of each virtual object in the first map block managed by the source logic server is destroyed.

In one exemplary embodiment of the present disclosure, a first determination module 1302 is further configured to determine an amount of virtual objects included in each of at least two map blocks; determine a map block including the largest amount of virtual objects as a first map block; or, determine a first map block from the at least two map blocks according to a number sequence of the at least two map blocks; or, randomly determine a first map block from the at least two map blocks.

As such, when a virtual object in the embodiment passes through a sub-map, a resource of the virtual object managed by a source logic server is copied to a target logic server, and after the copying is completed, the resource of the virtual object managed by the source logic server is destroyed. When a virtual object moves back and forth between a current sub-map and a target sub-map, compared with existing technologies, a resource of the virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

The following describes apparatus embodiments of the present disclosure, which can be used for executing method embodiments of the present disclosure. For details not disclosed in the apparatus embodiments of the present disclosure, the method embodiments of the present disclosure are consulted.

Figure 14:
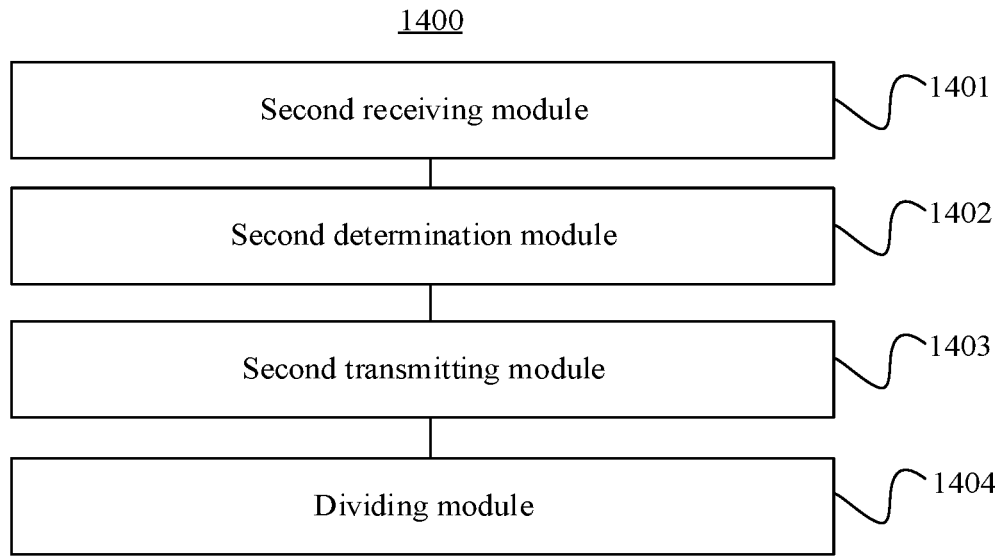
FIG. 14 is a schematic diagram of an apparatus for transferring a virtual object between maps provided by an embodiment of the present disclosure.

FIG. 14 is a block diagram of an apparatus for transferring a virtual object between maps provided by an embodiment of the present disclosure. The function may be implemented by hardware, or may be implemented by hardware executing corresponding software. The apparatus is connected to at least two logic servers. The at least two logic servers are configured to manage resources related to a virtual object in different sub-maps in a target map. The apparatus 1400 includes: a second receiving module 1401, configured to receive a map cutting request transmitted by a source logic server in the at least two logic servers, the map cutting request being transmitted when the virtual object enters a target sub-map from a current sub-map and a determination frame centering on the virtual object being overlapped with the target sub-map, and the current sub-map corresponding to the source logic server; a second determination module 1402, configured to determine a target logic server corresponding to the target sub-map from the at least two logic servers; and a second transmitting module 1403, configured to transmit an object resource transferring notice to the source logic server, the object resource transferring notice being used for notifying the source logic server to copy the resource of the virtual object to the target logic server, and after the copying is completed, destroying the resource of the virtual object managed by the source logic server.

In one exemplary embodiment of the present disclosure, a determination frame is an m-rectangle grid centering on a virtual object, and m is a positive integer; or, a determination frame is a rectangle with a virtual object as a geometric center. or, a determination frame is a circle with a virtual object as a circle center; or, a determination frame is a regular hexagon with a virtual object as a geometric center.

In one exemplary embodiment of the present disclosure, a second determination module 1402 is specifically configured to determine a first logic server from at least two logic servers when no logic server corresponding to a target sub-map exists in the at least two logic servers.

A second transmitting module 1403 is further configured to transmit a first map creation notice to the first logic server, the first map creation notice being used for notifying the first logic server to create a target sub-map.

The second determination module 1402 is specifically configured to determine the first logic server as a target logic server when a first map creation completion notice returned by the first logic server is received.

In one exemplary embodiment of the present disclosure, a second determination module 1402 is specially configured to determine a resource loading amount of a target sub-map when no logic server corresponding to the target sub-map exists in at least two logic servers, A second transmitting module 1403 is further configured to transmit a resource query request to the at least two logic servers in a multicast manner, the resource query request being used for querying respective remaining resource loading amounts of the at least two logic servers.

The second determination module 1402 is specifically configured to determine a first logic server according to resource query feedbacks returned by the at least two logic servers.

In one exemplary embodiment of the present disclosure, a second determination module 1402 is specifically configured to determine a second logic server from at least two logic servers when a logic server corresponding to a target sub-map in the at least two logic servers reaches an upper limit of a resource loading amount.

A second transmitting module 1403 is further configured to transmit a second map creation notice to the second logic server, the second map creation notice being used for notifying the second logic server to create the target sub-map.

The second determination module 1402 is specifically configured to determine the second logic server as a target logic server when a second map creation completion notice returned by the second logic server is received.

In one exemplary embodiment of the present disclosure, a second determination module 1402 is specifically configured to determine a resource loading amount of a target sub-map when a logic server corresponding to the target sub-map in at least two logic servers reaches an upper limit of a resource loading amount.

The second transmitting module 1403 is further configured to transmit a resource query request to the at least two logic servers in a multicast manner, the resource query request being used for querying remaining resource loading amounts of the at least two logic servers.

The second determination module 1402 is specifically configured to determine a second logic server according to resource query feedbacks returned by the at least two logic servers.

In one exemplary embodiment of the present disclosure, a second determination module 1402 is specifically configured to determine a logic server corresponding to a target sub-map as a target logic server when a logic server corresponding to the target sub-map exists in the at least two logic servers.

In one exemplary embodiment of the present disclosure, a virtual object uses an object identifier; and a second transmitting module 1403 is specifically configured to transmit an object resource transferring notice to a source logic server, the object resource transferring notice being used for notifying the source logic server to copy a resource of a virtual object using the object identifier to a target logic server, and after the copying is completed, destroy the resource of the virtual object using the object identifier managed by the source logic server.

In one exemplary embodiment of the present disclosure, a current sub-map includes at least two map blocks; and a second receiving module 1401 is further configured to receive a virtual object transferring request transmitted by a source logic server, the virtual object transferring request being generated when the current sub-map reaches an upper limit of a resource loading amount.

A second determination module 1402 is further configured to determine a resource receiving logic server from the at least two logic servers.

A second transmitting module 1403 is further configured to transmit a virtual object transferring notice to a source logic server, the virtual object transferring notice being used for notifying the source logic server to copy a resource of each virtual object in a first map block of the at least two map blocks to the resource receiving logic server, and after the copying is completed, destroy the resource of each virtual object in the first map block managed by the source logic server.

In one exemplary embodiment of the present disclosure, an apparatus further includes: a dividing module 1404, configured to divide a map into k sub-maps, k being an integer greater than 1.

A second transmitting module 1403 is further configured to transmit a sub-map loading request to N logic servers, the sub-map loading request being used for notifying the N logic servers to respectively load map resources of the k sub-maps, and N being a positive integer greater than 1.

In one exemplary embodiment of the present disclosure, the dividing module 1404 is specifically configured to randomly divide a map into k sub-maps; or, uniformly divide a map into k sub-maps; or, divide a map into k sub-maps according to map environment types.

In one exemplary embodiment of the present disclosure, an apparatus is further connected to a proxy server; a second transmitting module 1403 is specifically configured to transmit first information to the proxy server, the proxy server being configured to forward the first information to at least two logic servers; a second receiving module 1401 is specifically configured to receive second information forwarded by the proxy server, the second information being information provided by the at least two logic servers.

When a virtual object in the embodiment passes through a sub-map, a resource of the virtual object managed by a source logic server is copied to a target logic server, and after the copying is completed, the resource of the virtual object managed by the source logic server is destroyed. When a virtual object moves back and forth between a current sub-map and a target sub-map, compared with existing technologies, a resource of the virtual object in the present disclosure only exists on one logic server, so that an impact on a game logic is reduced, development efficiency is improved, the resource does not need to be frequently synchronized between two logic servers, pressure of a logic server can be reduced, and burden on the logic server is reduced.

Figure 15:
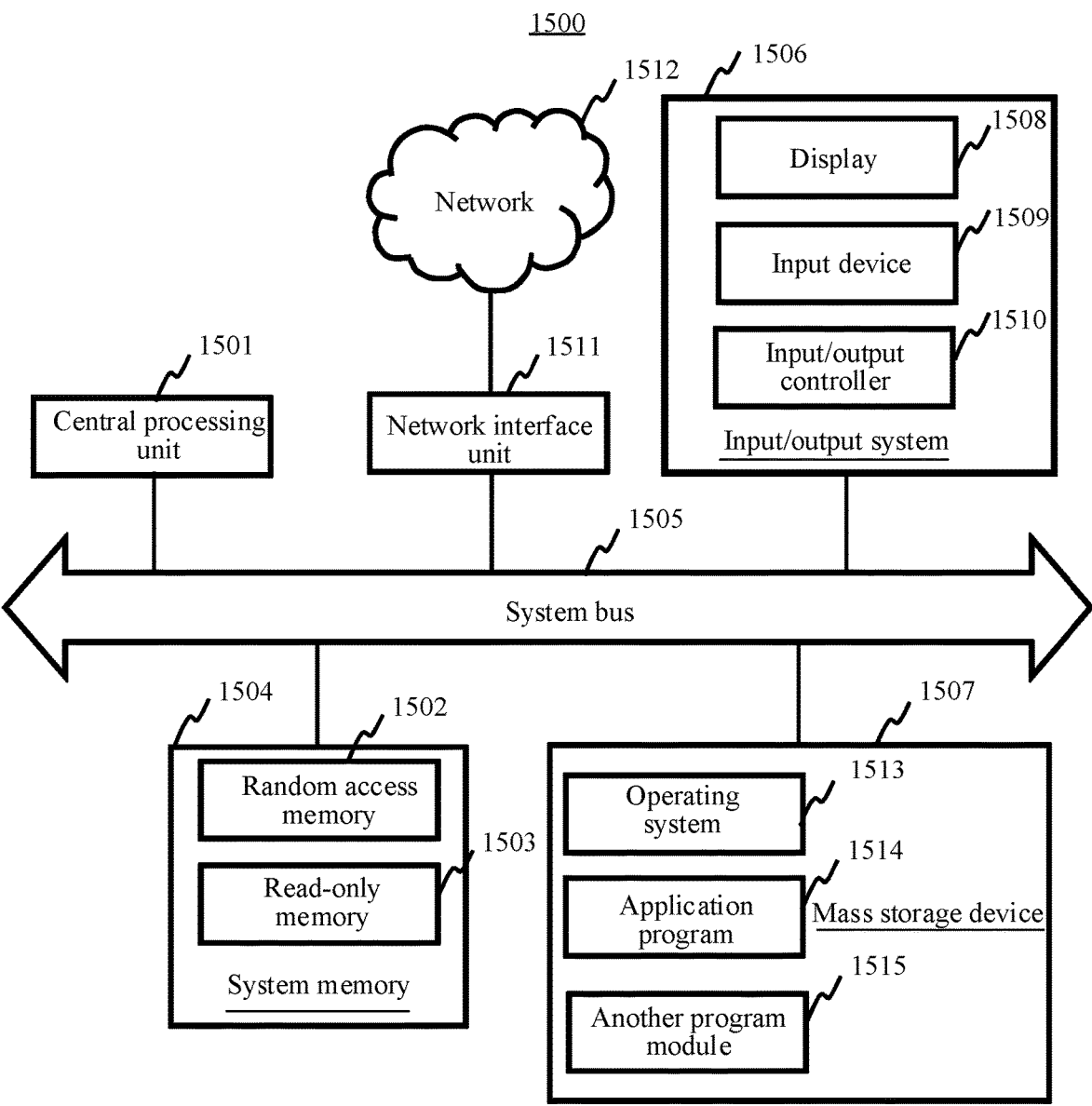
FIG. 15 is a schematic diagram of a computer device provided by an embodiment of the present disclosure.

FIG. 15 is a schematic structural diagram of a computer device according to an exemplary embodiment. The computer device 1500 includes a central processing unit (CPU) 1501, a system memory 1504 including a random access memory (RAM) 1502 and a read-only memory (ROM) 1503, and a system bus 1505 connecting the system memory 1504 and the CPU 1501. The computer device 1500 further includes a basic input/output (I/O) system 1506 assisting in transmitting information between components in the computer device, and a mass storage device 1507 configured to store an operating system 1513, an application program 1514, and another program module 1515.

The basic I/O system 1506 includes a display 1508 configured to display information and an input device 1509 such as a mouse or a keyboard that is used for inputting information by a user. The display 1508 and the input device 1509 are both connected to the CPU 1501 by using an input/output controller 1510 connected to the system bus 1505. The basic I/O system 1506 may further include the input/output controller 1510 to be configured to receive and process inputs from multiple other devices such as a keyboard, a mouse, and an electronic stylus. Similarly, the input/output controller 1510 further provides an output to a display screen, a printer, or another type of output device.

The mass storage device 1507 is connected to the CPU 1501 by using a mass storage controller (not shown) connected to the system bus 1505. The mass storage device 1507 and a computer device readable medium associated with the mass storage device provide non-volatile storage to the computer device 1500. That is, the mass storage device 1507 may include a computer device readable medium (not shown) such as a hard disk or a compact disc ROM (CD-ROM) drive.

The computer device readable medium may include a computer device storage medium and a communications medium. The computer device storage medium includes volatile and non-volatile media, and removable and non-removable media implemented by using any method or technology used for storing information such as a computer device readable instruction, a data structure, a program module, or other data. The computer device storage medium includes a RAM, a ROM, an erasable programmable ROM (EPROM), an electrically erasable programmable ROM (EEPROM), a CD-ROM, a digital video disc (DVD) or another optical memory, a tape cartridge, a magnetic cassette, a magnetic disk memory, or another magnetic storage device. Certainly, a person skilled in the art may learn that a computer device storage medium is not limited to the foregoing several types. The above system memory 1504 and the mass storage device 1507 may be collectively referred to as memories.

According to various embodiments of the present disclosure, a computer device 1500 may also be operated by a remote computer device connected to a network via a network, such as the Internet. That is, a computer device 1500 may be connected to a network 1511 by using a network interface unit 1512 connected to the system bus 1505, or may be connected to another type of network or a remote computer system (not shown) by using a network interface unit 1512.

A memory further includes one or more programs. The one or more programs are stored in the memory. A central processing unit 1501 performs the one or more programs to implement all or part of steps of methods for transferring a virtual object between maps.

An exemplary embodiment further provides a computer-readable storage medium, the computer-readable storage medium stores at least one instruction, at least one section of program, a code set, or an instruction set, and the at least one instruction, the at least one section of program, the code set, or the instruction set are loaded and performed by a processor to implement a method for transferring a virtual object between maps provided by each foregoing method embodiment.

The present disclosure further provides a computer-readable storage medium, the storage medium stores at least one instruction, at least one section of program, a code set, or an instruction set, and the at least one instruction, the at least one section of program, the code set or the instruction set are loaded and performed by a processor to implement a method for transferring a virtual object between maps provided by a foregoing method embodiment.

The present disclosure further provides a computer program product or a computer program including a computer instruction stored in a computer-readable storage medium. A processor of a computer device reads the computer instruction from a computer-readable storage medium, and the processor performs the computer instruction to cause the computer device to perform a method for transferring a virtual object between maps provided in an above embodiment.

The sequence numbers of the foregoing embodiments of the present disclosure are merely for description purpose but do not imply the preference among the embodiments.

The term module (and other similar terms such as sub-module, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for transferring a virtual object between maps, executed by a source logic server configured to manage a resource of virtual objects in a current sub-map, the method comprising:

when the virtual object enters a target sub-map from the current sub-map in a map and a determination frame centering on the virtual object is overlapped with the target sub-map:

setting the determination frame centering on the virtual object;

in response to the determination frame overlapping with the current sub-map and the target sub-map as the virtual object moving from the current sub-map, determining that the virtual object enters the target sub-map from the current sub-map; and in response to the determination frame completely falling in the target sub-map, transmitting a map cutting request to a scheduling server, a projection area of the determination frame in the map being greater than a projection area of the virtual object in the map, and the scheduling server being connected to at least two logic servers, wherein the current sub-map comprises at least two map blocks;

determining a target logic server from the at least two logic servers according to an object resource transferring notice returned by the scheduling server;

copying a resource of the virtual object to the target logic server, and after the copying is completed, destroying the resource of the virtual object;

transmitting a virtual object transferring request to the scheduling server when the current sub-map reaches an upper limit of a resource loading amount; and according to a virtual object transferring notice returned by the scheduling server, copying resources of virtual objects in a first map block in the at least two map blocks to a resource receiving logic server, and after the copying is completed, destroying the resources of the virtual objects in the first map block managed by the source logic server.

2. The method of claim 1, wherein the determination frame is an m-rectangle grid centering on the virtual object, and m being a positive integer;

or, the determination frame is a rectangle with the virtual object as a geometric center;

or, the determination frame is a circle with the virtual object as a circle center; and or, the determination frame is a regular hexagon with the virtual object as a geometric center.

3. The method of claim 1, wherein the virtual object includes an object identifier; and copying the resource of the virtual object to the target logic server, and after the copying is completed, destroying the resource of the virtual object comprises:

copying the resource of the virtual object that uses the object identifier to the target logic server, and after the copying is completed, destroying the resource of the virtual object that uses the object identifier managed by the source logic server.

4. The method of claim 1, further comprising:

determining an amount of virtual objects comprised in the at least two map blocks; determining a map block, from the at least two map blocks, comprising a largest amount of virtual objects as a first map block;

or, determining a first map block from the at least two map blocks according to a number sequence of the at least two map blocks;

or, selecting a first map block from the at least two map blocks.

5. A computer device, the computer device comprising: a processor and a memory, the memory storing at least one section of program, and the at least one section of program being loaded and performed by the processor to implement:

when a virtual object enters a target sub-map from the current sub-map in a map and a determination frame centering on the virtual object is overlapped with the target sub-map:

setting the determination frame centering on the virtual object;

in response to the determination frame overlapping with the current sub-map and the target sub-map as the virtual object moving from the current sub-map, determining that the virtual object enters the target sub-map from the current sub-map; and in response to the determination frame completely falling in the target sub-map, transmitting a map cutting request to a scheduling server, a projection area of the determination frame in the map being greater than a projection area of the virtual object in the map, and the scheduling server being connected to at least two logic servers, wherein the current sub-map comprises at least two map blocks;

determining a target logic server from the at least two logic servers according to an object resource transferring notice returned by the scheduling server;

copying a resource of the virtual object to the target logic server, and after the copying is completed, destroying the resource of the virtual object;

transmitting a virtual object transferring request to the scheduling server when the current sub-map reaches an upper limit of a resource loading amount; and according to a virtual object transferring notice returned by the scheduling server, copying resources of virtual objects in a first map block in the at least two map blocks to a resource receiving logic server, and after the copying is completed, destroying the resources of the virtual objects in the first map block managed by the source logic server.

6. The computer device of claim 5, wherein the determination frame is an m-rectangle grid centering on the virtual object, and m being a positive integer;

or, the determination frame is a rectangle with the virtual object as a geometric center;

or, the determination frame is a circle with the virtual object as a circle center; and or, the determination frame is a regular hexagon with the virtual object as a geometric center.

7. The computer device of claim 5, wherein the virtual object includes an object identifier; and copying the resource of the virtual object to the target logic server, and after the copying is completed, destroying the resource of the virtual object comprises:

copying the resource of the virtual object that uses the object identifier to the target logic server, and after the copying is completed, destroying the resource of the virtual object that uses the object identifier.

8. The computer device of claim 5, wherein the processor is further configured to implement:

determining an amount of virtual objects comprised in the at least two map blocks; determining a map block, from the at least two map blocks, comprising a largest amount of virtual objects as a first map block;

or, determining a first map block from the at least two map blocks according to a number sequence of the at least two map blocks;

or, selecting a first map block from the at least two map blocks.

9. A non-transitory computer-readable storage medium storing program code, wherein the program code is loaded and performed by a processor to implement:

when a virtual object enters a target sub-map from the current sub-map in a map and a determination frame centering on the virtual object is overlapped with the target sub-map:

setting the determination frame centering on the virtual object;

in response to the determination frame overlapping with the current sub-map and the target sub-map as the virtual object moving from the current sub-map, determining that the virtual object enters the target sub-map from the current sub-map; and in response to the determination frame completely falling in the target sub-map, transmitting a map cutting request to a scheduling server, a projection area of the determination frame in the map being greater than a projection area of the virtual object in the map, and the scheduling server being connected to at least two logic servers, wherein the current sub-map comprises at least two map blocks;

determining a target logic server from the at least two logic servers according to an object resource transferring notice returned by the scheduling server;

copying a resource of the virtual object to the target logic server, and after the copying is completed, destroying the resource of the virtual object;

transmitting a virtual object transferring request to the scheduling server when the current sub-map reaches an upper limit of a resource loading amount; and according to a virtual object transferring notice returned by the scheduling server, copying resources of virtual objects in a first map block in the at least two map blocks to a resource receiving logic server, and after the copying is completed, destroying the resources of the virtual objects in the first map block managed by the source logic server.

10. The storage medium of claim 9, wherein the determination frame is an m-rectangle grid centering on the virtual object, and m being a positive integer;

or, the determination frame is a rectangle with the virtual object as a geometric center;

or, the determination frame is a circle with the virtual object as a circle center; and or, the determination frame is a regular hexagon with the virtual object as a geometric center.

11. The storage medium of claim 9, wherein the virtual object includes an object identifier; and copying the resource of the virtual object to the target logic server, and after the copying is completed, destroying the resource of the virtual object, comprises:

copying the resource of the virtual object that uses the object identifier to the target logic server, and after the copying is completed, destroying the resource of the virtual object that uses the object identifier.

* * * * *